United States Patent
Liotta et al.

(10) Patent No.: US 12,478,900 B2
(45) Date of Patent: Nov. 25, 2025

(54) SOLID-LIQUID FILTRATION ASSEMBLY AND METHOD OF USE

(71) Applicants: Paul Liotta, Alexandria, LA (US); Zachary McPherson, Alexandria, LA (US)

(72) Inventors: Paul Liotta, Alexandria, LA (US); Zachary McPherson, Alexandria, LA (US)

(*) Notice: Subject to any disclaimer, the term of this patent is extended or adjusted under 35 U.S.C. 154(b) by 451 days.

(21) Appl. No.: 18/104,589

(22) Filed: Feb. 1, 2023

(65) Prior Publication Data
US 2024/0252957 A1  Aug. 1, 2024

(51) Int. Cl.

| | |
|---|---|
| *B01D 24/22* | (2006.01) |
| *B01D 24/40* | (2006.01) |
| *B01D 24/42* | (2006.01) |
| *B01D 24/44* | (2006.01) |
| *B01D 24/46* | (2006.01) |
| *C02F 11/12* | (2019.01) |
| *C02F 11/121* | (2019.01) |

(52) U.S. Cl.
CPC ........... *B01D 24/22* (2013.01); *B01D 24/402* (2013.01); *B01D 24/425* (2013.01); *B01D 24/44* (2013.01); *C02F 11/121* (2013.01); *B01D 24/461* (2013.01)

(58) Field of Classification Search
CPC .... B01D 24/22; B01D 24/402; B01D 24/425; B01D 24/44; B01D 24/461; C02F 11/121
USPC .............. 210/266, 271, 272, 284, 807
See application file for complete search history.

(56) References Cited

U.S. PATENT DOCUMENTS

| | | | |
|---|---|---|---|
| 3,702,135 A * | 11/1972 | Takahashi et al. | .... B01D 35/16 210/272 |
| 4,673,476 A | 6/1987 | Mitsui et al. | |
| 4,673,502 A | 6/1987 | Fox | |
| 5,407,587 A | 4/1995 | Westerberg | |
| 7,585,411 B2 | 9/2009 | Knappe et al. | |
| 2021/0060460 A1 | 3/2021 | Arai | |

FOREIGN PATENT DOCUMENTS

| | | | |
|---|---|---|---|
| EP | 1243559 A2 * | 9/2002 | ............ B01D 33/50 |
| WO | WO0061874 | 4/1999 | |
| WO | WO2017129164 | 2/2013 | |
| WO | WO2017179246 | 4/2016 | |

* cited by examiner

*Primary Examiner* — Fred Prince (57) ABSTRACT

A solid-liquid filtration assembly for removing solids from a solid-liquid mixture includes a filter module comprising a pan, to which a screen is attached, and a scraping arm, to which is attached slurry nozzles. A media bed on the screen separates solids from a mixture of a liquid and the solids. Filtrate drains from the pan via a drain tube. A scraping arm removes dewatered solids and soiled media from atop the media bed, forward of the scraping arm. The scraping arm also expels the dewatered solids and the soiled media from the pan, while slurry nozzles deliver the mixture to the media bed aft of the scraping arm.

14 Claims, 8 Drawing Sheets

SOLID-LIQUID FILTRATION ASSEMBLY AND METHOD OF USE

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to filtration assemblies and more particularly pertains to a new filtration assembly for removing solids from a solid-liquid mixture. The present invention discloses a filtration assembly comprising a circular screen upon which a media bed can be formed, and a rotating scraping arm that removes dried solids and soiled media from atop the media bed.

(2) Description of Related Art Including Information Disclosed Under 37 CFR 1.97 and 1.98

The prior art relates to filtration assemblies. PCT Application WO 2017/179246 teaches a horizontal filtration assembly for organic waste that uses gravel as the separation media and which does not include a scraping mechanism for removal dried solids. The prior art also teaches various filtration assemblies comprising rotating drums, which may have scrapers for removing dries solids, but which have limited contact area between the mixture to be filtered and the media bed, and thus low processing volumes. Additionally, rotating drums have issues retaining the media bed. What is lacking in the prior art is a filtration assembly comprising a circular screen, for supporting a media bed, and a rotating scraping arm for removing dried solids and soiled media from atop the media bed, wherein a plurality of slurry nozzles attached to the scraping arm deliver a mixture that is to be separated to the media bed aft of the scraping arm.

(h) BRIEF SUMMARY OF THE INVENTION

An embodiment of the disclosure meets the needs presented above by generally comprising a filter module, which is attached to and positioned within a frame. The filter module comprises a pan, which is circular and to which a screen is attached, and a scraping arm, which is tubular and to which is attached a plurality of slurry nozzles. The screen is configured to have positioned thereon a separation media to form a media bed that is capable of separating solids from a mixture of a liquid and the solids. A drain tube is attached to the pan below the screen and is configured to drain filtrate from the pan.

A shaft is rotatably attached to the frame and extends axially through the pan and the screen. The scraping arm is attached to and rotates concurrently with the shaft. An inlet port is in fluidic communication with the scraping arm and is configured to allow for attachment to a source of the mixture. A motor is attached to the frame and is operationally engaged to the shaft, thereby enabling the motor to selectively rotate the shaft and the scraping arm. The scraping arm is configured to remove dewatered solids and soiled media from atop the media bed and forward of the scraping arm. The scraping arm also is configured to expel the dewatered solids and the soiled media from the pan. The plurality of slurry nozzles is configured to deliver the mixture to the media bed aft of the scraping arm.

Another embodiment of the disclosure includes a solid-liquid filtration system, which comprises a solid-liquid filtration assembly, according to the disclosure above, a separation media that is positioned on the screen, a mixture tank containing the mixture and which is in fluidic communication with the inlet port, and a filtrate tank that is in fluidic communication with the drain tube.

Yet another embodiment of the disclosure includes a method of filtering solids from a solid-liquid mixture. Provision steps entail providing a mixture tank containing a mixture to be filtered, providing a separation media, providing a filtrate tank, and providing a solid-liquid filtration assembly, according to the disclosure above. Setup steps entail forming a media bed and connecting the mixture and filtrate tanks. Operational steps entail actuating a vacuum pump and the solid-liquid filtration assembly.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

With reference now to the drawings, and in particular to FIGS. 1 through 9 thereof, a new filtration assembly embodying the principles and concepts of an embodiment of the disclosure and generally designated by the reference numeral 10 will be described.

Figure 1:
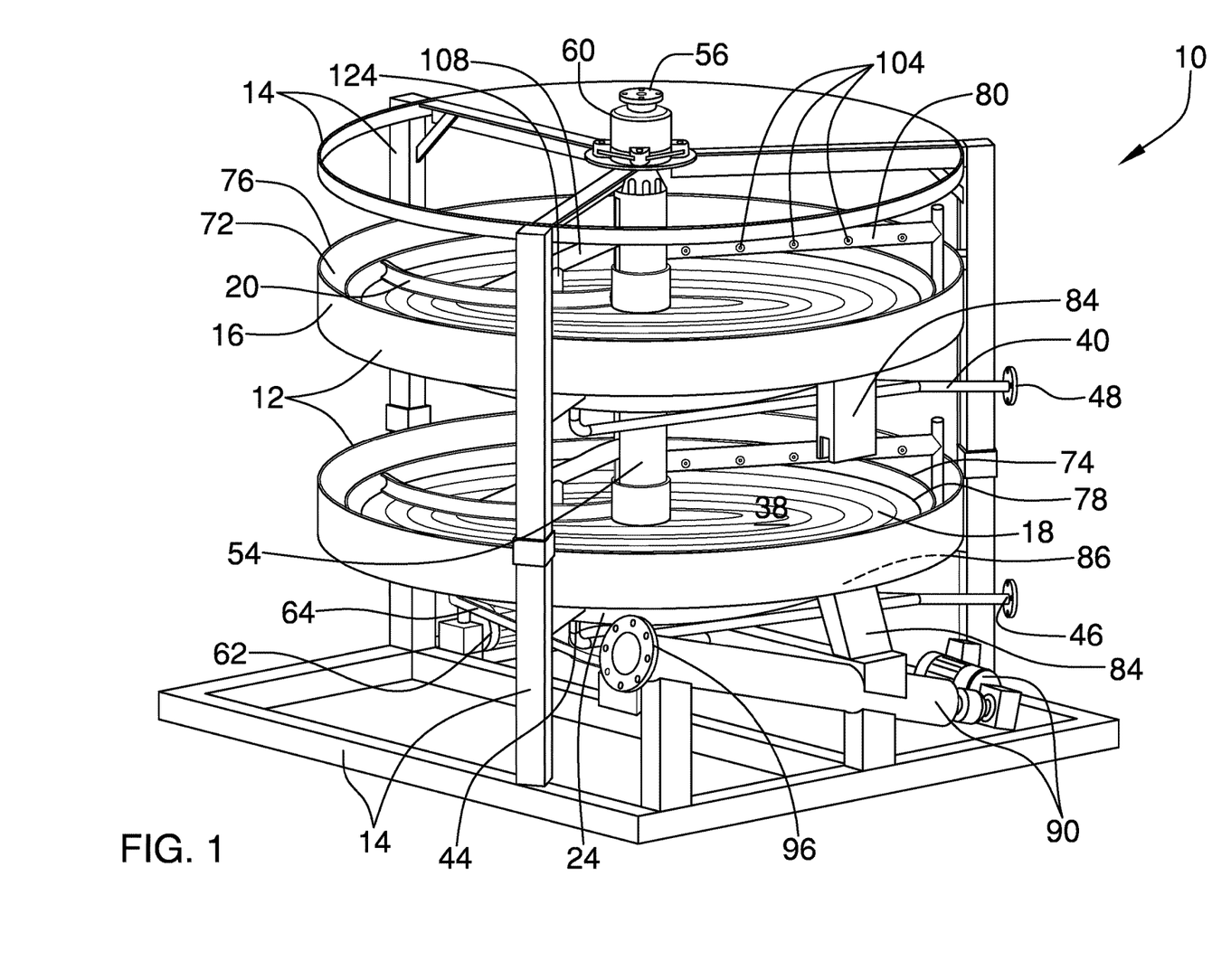
FIG. 1 is an isometric perspective view of a solid-liquid filtration assembly according to an embodiment of the disclosure.

As best illustrated in FIGS. 1 through 9, the solid-liquid filtration assembly 10 generally comprises a filter module 12, which is attached to and which is positioned within a frame 14. The filter module 12 may be one of a plurality of filter modules 12, such as is shown in FIG. 1, wherein the plurality of filter modules 12 comprises two filter modules 12, which operate in parallel. The present invention also anticipates the plurality of filter modules 12 comprising more than two filter modules 12, as well as a plurality of filter modules 12 wherein two or more of the filter modules 12 operate in series. For clarity, the frame 14 is shown open, but the solid-liquid filtration assembly 10 also may comprises panels (not shown), which are attached to and substantially enclose the frame 14, with one or more of the panels being hinged to allow for access.

Figure 3:
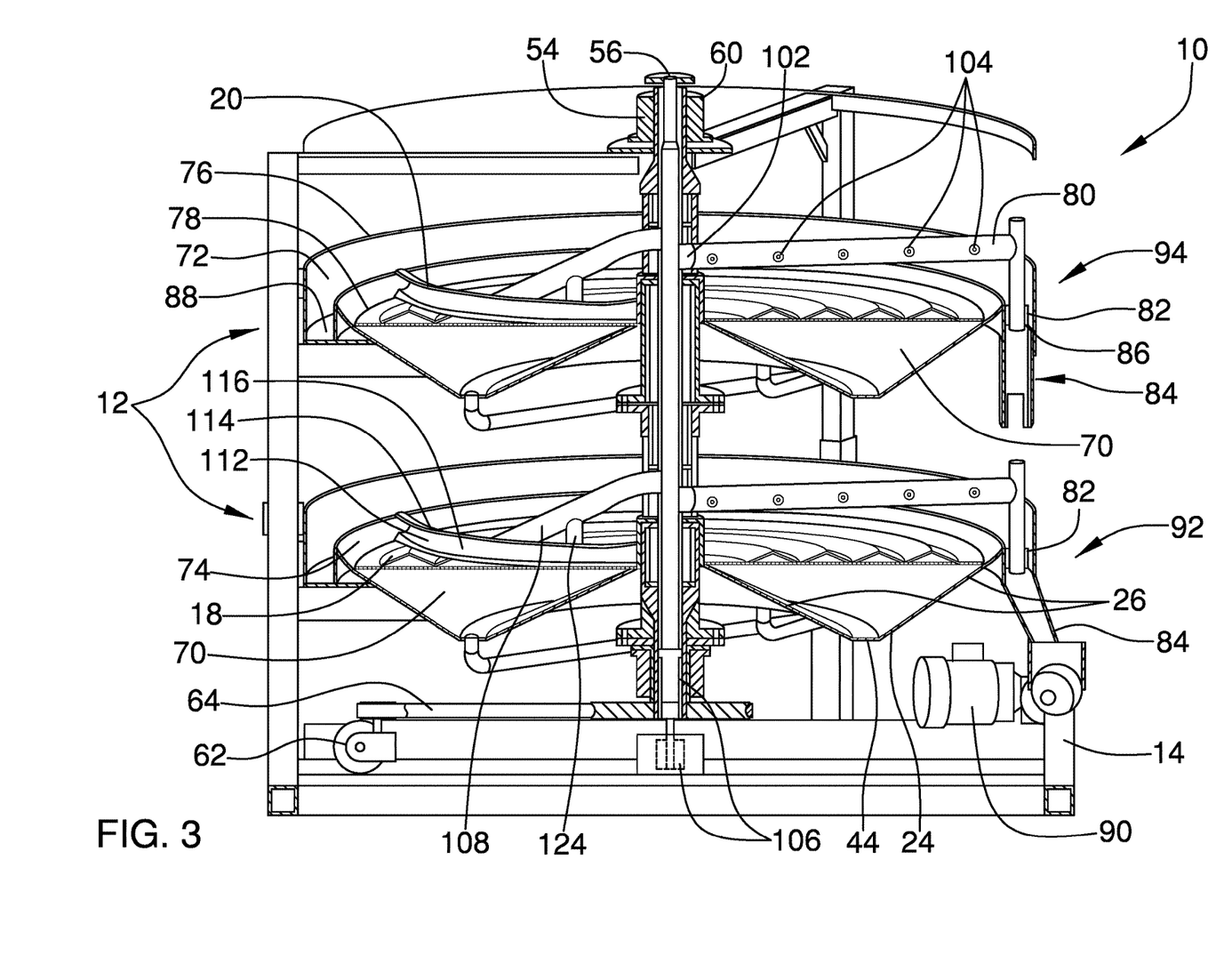
FIG. 3 is a cross-sectional view of an embodiment of the disclosure.

The filter module 12 comprises a pan 16, which is circular and to which is attached a screen 18, and a scraping arm 20, which is tubular and to which is attached a plurality of slurry nozzles 22. A bottom 24 of the pan 16 has a cross-sectional profile 26, which may be V-shaped, as is shown in FIG. 3, so as to facilitate collection of filtrate 42. The present invention also anticipates the bottom 24 of the pan 16 having a cross-sectional profile 26 that is semicircular, half ovoid, or the like.

Figure 7:
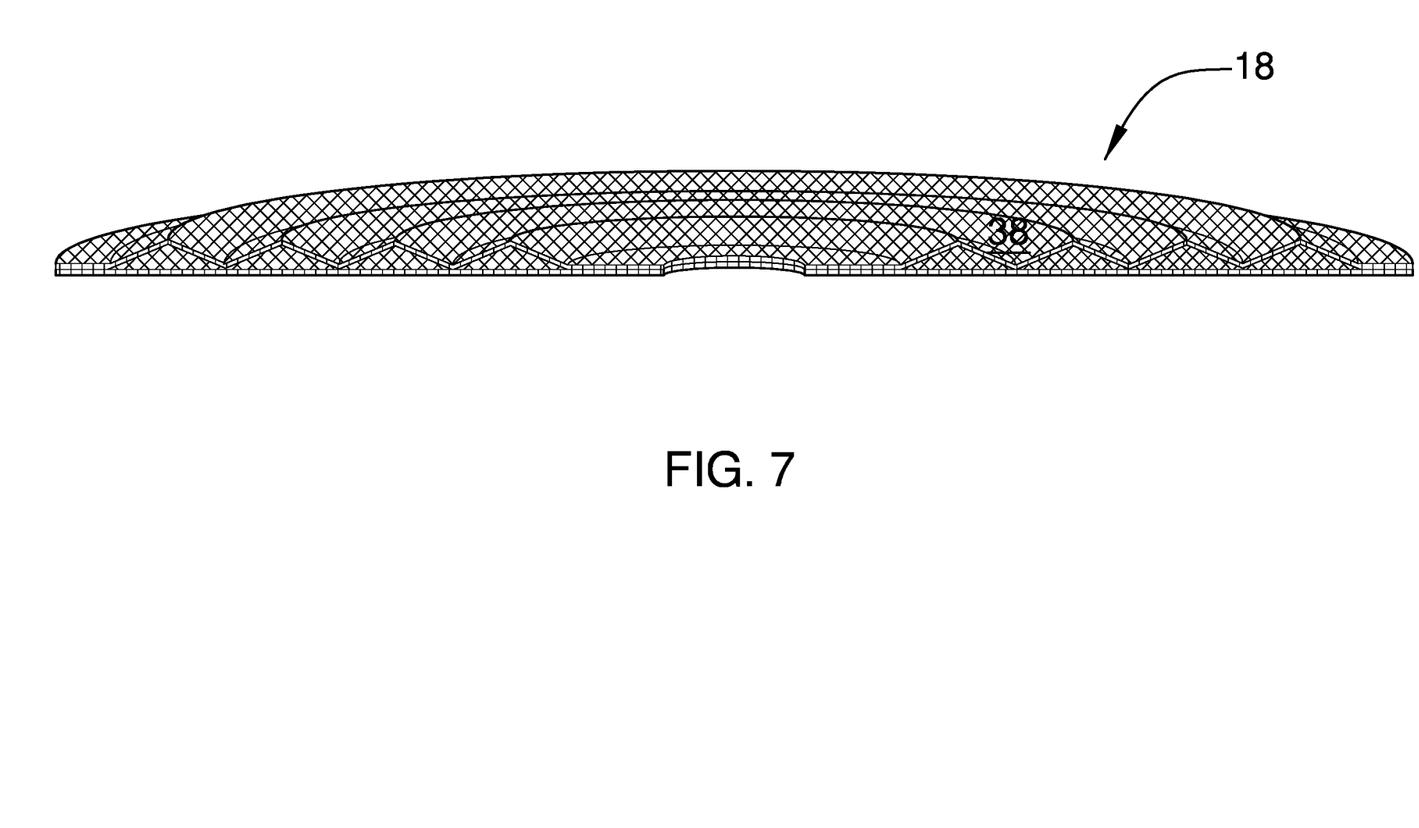
FIG. 7 is a detail view of an embodiment of the disclosure.

The screen 18 is configured to have positioned thereon a separation media 28 to form a media bed 30 (a process is often referred to as "precoating") that is capable of separating solids 32 from a mixture 34 of a liquid 36 and the solids 32. Such separation media 28 are well known to those skilled in the art of filtration and include, but are not limited to, diatomaceous earth, perlite, sand, and the like. As is shown in FIG. 7, the screen 18 is corrugated, thereby effectively increasing a surface area 38 of the screen 18, relative to a screen 18 that is planar. As will be apparent to those skilled in the art of filtration, increasing the surface area 38 of the screen 18 facilitate filtration.

Figure 2:
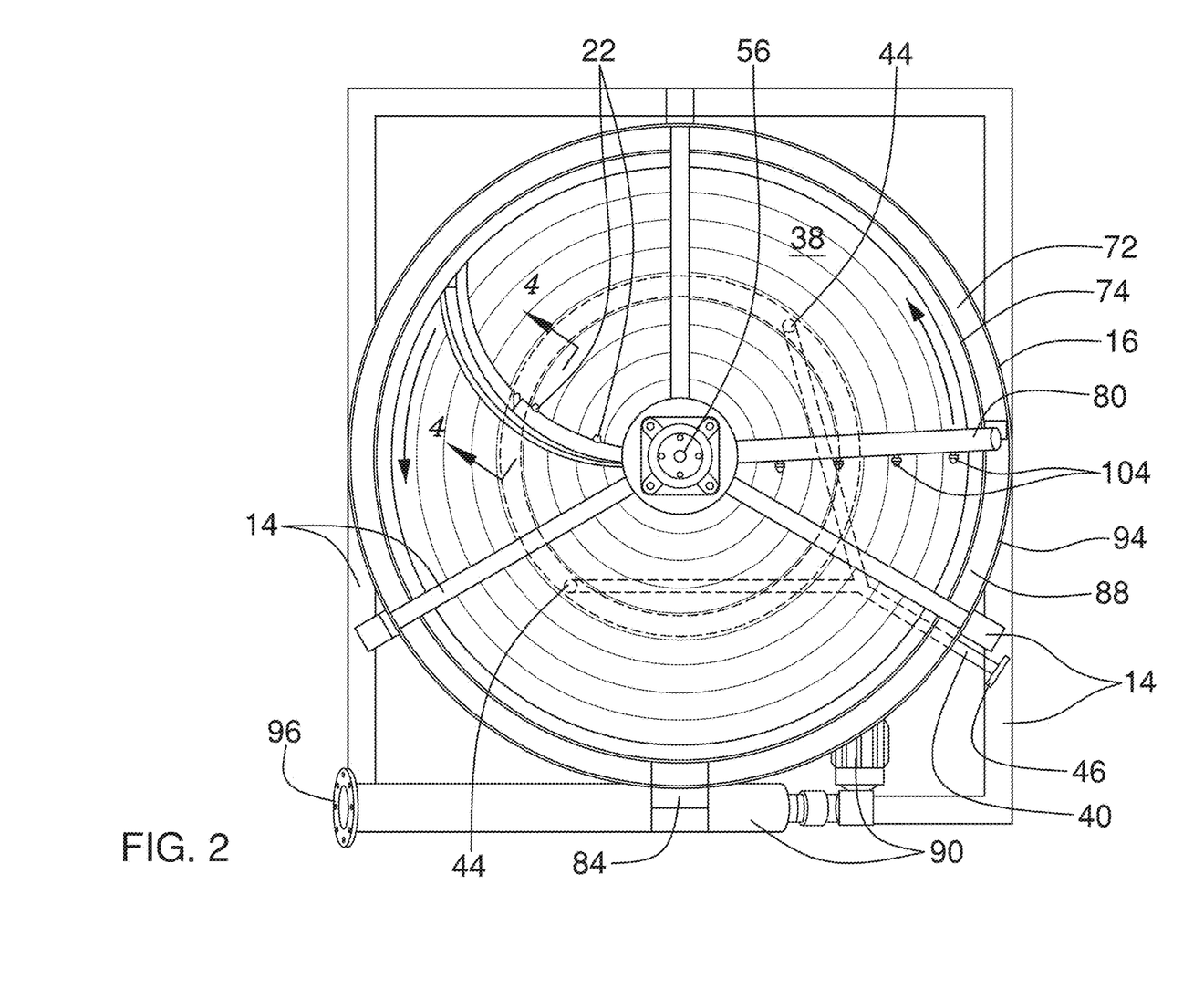
FIG. 2 is a top view of an embodiment of the disclosure.

A drain tube 40 is attached to the pan 16 below the screen 18 and is configured to drain a filtrate 42 from the pan 16. A first terminus 44 of the drain tube 40 is attached to the pan 16 and a second terminus 46 of the drain tube 40 is positioned proximate to the frame 14. As is shown in FIG. 2, a vacuum connector 48 is attached to the second terminus 46 and is configured to connect to a filtrate tank 50, which is under partial vacuum by means of operationally engagement to a vacuum pump 52. As such, a partial pressure exists below the screen 18 and facilitates filtration of the mixture 34. The drain tube 40 may have two first termini 44 and thus be Y-shaped, as is shown in FIG. 2 wherein the first termini 44 are opposingly positioned relative to a shaft 54.

An inlet port 56 is in fluidic communication with the scraping arm 20 and is configured to allow for attachment to a source of the mixture 34, such as a mixture tank 58. Mixture tank 58, in the context of this disclosure, should be interpreted to mean any vessel containing a mixture 34 of a liquid 36 and solids 32 from which filtration of the solids 32 is intended. The scraping arm 20 is attached to and rotates concurrently with the shaft 54, which is rotatably attached to the frame 14 and which extends axially through the pan 16 and the screen 18. The shaft 54 is tubular so that the scraping arm 20 is in fluidic communication with the shaft 54. The inlet port 56 may be rotationally attached to an upper end 60 of the shaft 54 so that the inlet port 56 is stationary relative to the frame 14. The present invention also anticipates an inlet pipe (not shown), which is positioned in the shaft 54 and which is connected to the inlet port 56 and the scraping arm 20.

A motor 62 is attached to the frame 14 and is operationally engaged to the shaft 54, thereby enabling the motor 62 to selectively rotate the shaft 54 and the scraping arm 20. The motor 62 may be operationally engaged to the shaft 54 by means of a belt 64, as is shown in FIG. 1, or other engagement means, such as, but not limited to, drive chains, gearboxes, and the like.

Figure 4:
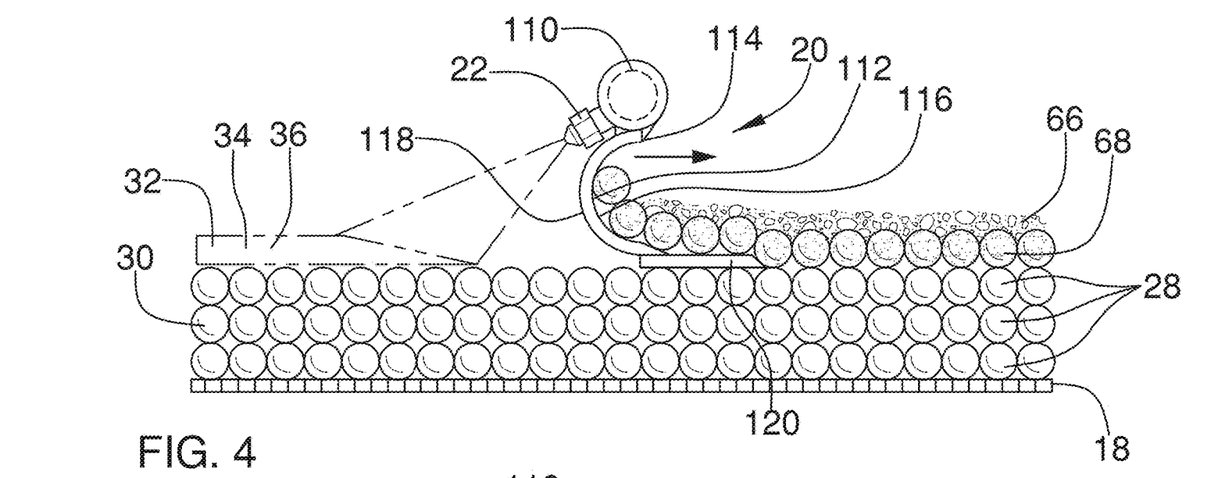
FIG. 4 is an in-use view of an embodiment of the disclosure.
Figure 5:
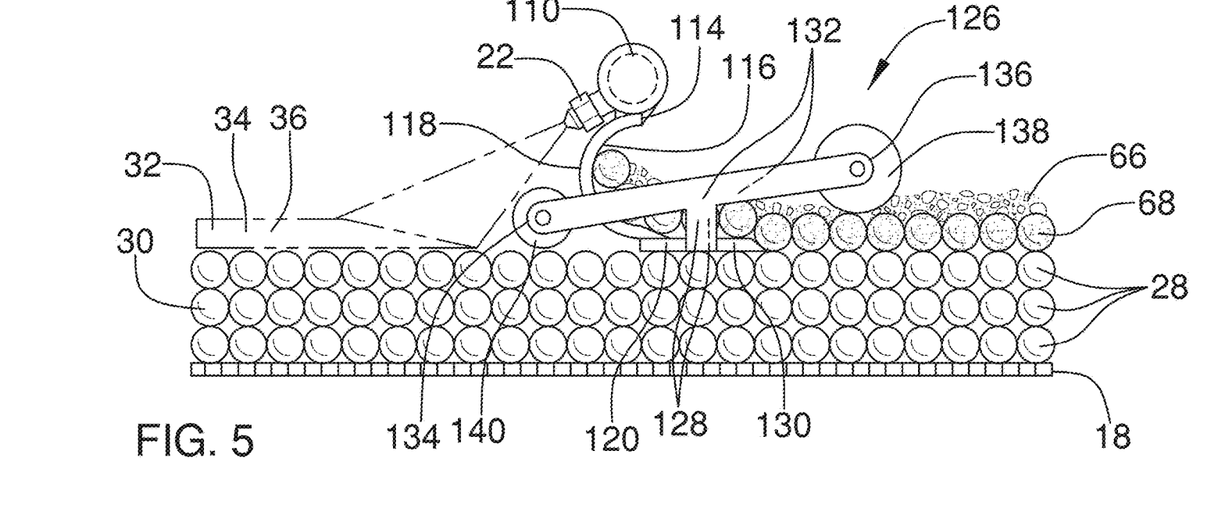
FIG. 5 is an in-use view of an embodiment of the disclosure.
Figure 6:
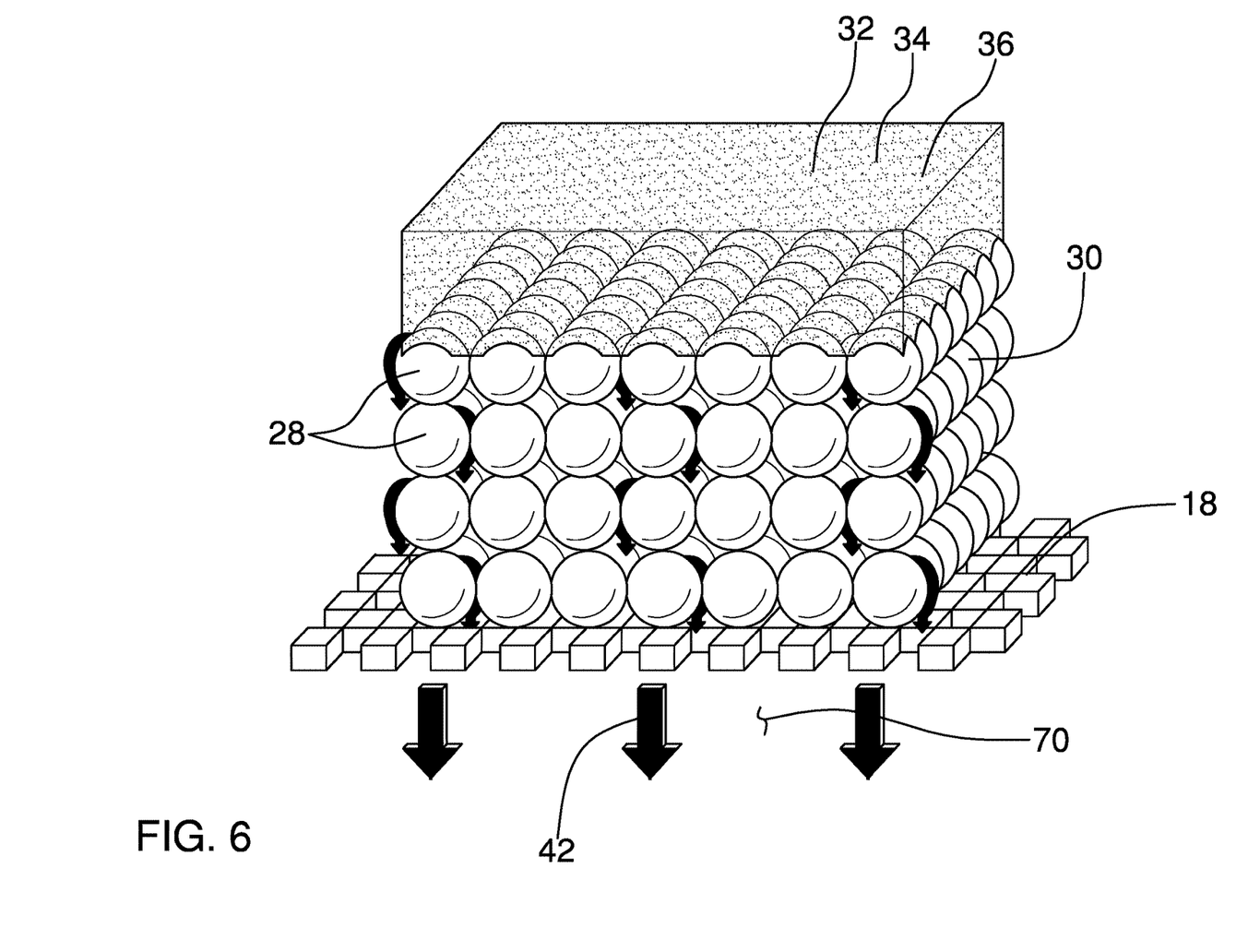
FIG. 6 is an in-use view of an embodiment of the disclosure.

The scraping arm 20 is configured to remove dewatered solids 66 and soiled media 68 from atop the media bed 30, forward of the scraping arm 20, as is shown in FIGS. 4 and 5. The scraping arm 20 also is configured to expel the dewatered solids 66 and the soiled media 68 from the pan 16. As the scraping arm 20 rotates, the plurality of slurry nozzles 22 is configured to deliver the mixture 34 to the media bed 30 aft of the scraping arm 20. As the space 70 between the screen 18 and the bottom 24 of the pan 16 is under partial pressure, the liquid 36 is pulled through the media bed 30 to generate the filtrate 42, which collects in the pan 16 and which then is drained off to the filtrate tank 50 via the drain tube 40.

The scraping arm 20 is intended to remove only the soiled media 68 along with the dewatered solids 66. With every rotation, the scraping arm 20 lowers, as described below, and scrapes off the soiled media 68. The scraping arm 20 discharges the dewatered solids 66 and the soiled media 68 outwards into a trough 72, as described below. The scraping arm 20 rotates at a slow and adjustable rate, with the mixture 34 being added atop freshly scraped media bed 30 aft of the scraping arm 20. The slow rotation allows the mixture 34 time to be separated and solids 32 to be dewatered before the scraping arm 20 completes a full rotation and removes the dewatered solids 66 and the soiled media 68.

One configuration of the filter module 12, which is shown in FIGS. 1-3, also comprises a ring 74, which is attached within and which extends circumferentially around the pan 16 proximate to a top 76 of the pan 16. The ring 74 is L-shaped so that the pan 16 and the ring 74 define the trough 72. The screen 18 is attached to a lower limit 78 of the ring 74. A support arm 80 is attached to and extends from the shaft 54 substantially opposite the scraping arm 20. The support arm 80 is tubular and thus in fluidic communication with the shaft 54. A scraper 82 is attached to and extends from the support arm 80 into the trough 72.

A chute 84 is attached to the ring 74 and extends from a cutout 86, which is positioned in a lower facet 88 of the ring 74. As the shaft 54 rotates, the scraper 82 moves through the trough 72 pushing the dewatered solids 66 and the soiled media 68 in front of it to the cutout 86, where they drop into the chute 84. The chute 84 is configured to direct the dewatered solids 66 and the soiled media 68 away from the filter module 12. A motorized auger 90 is attached to the frame 14 and is positioned to receive the dewatered solids 66 and the soiled media 68 from the chute 84. The motorized auger 90 is configured to discharge the dewatered solids 66 and the soiled media 68.

As is shown in FIG. 3, the chute 84 of a lower one 92 of the filter modules 12 feeds directly to the motorized auger 90 and the chute 84 of an upper one 94 of the filter modules 12 feeds to the trough 72 of the lower one 92 of the filter modules 12. The present invention also anticipates the chute 84 of the upper one 94 of the filter modules 12 feeding directly to the motorized auger 90. A coupler 96 that is attached to the end of the motorized auger 90 can be used to selectively couple the motorized auger 90 to a waste receptacle 98 for disposal of the dewatered solids 66 and the soiled media 68.

A two-way valve 102 is positioned between the support arm 80 and the shaft 54. The two-way valve 102 is configured to selectively allow entry of water that is pumped through the inlet port 56 into the support arm 80. A plurality of spray nozzles 104 is attached to the support arm 80 and is configured to spray the water onto the screen 18 to motivate soiled media 68 on the screen 18 to the trough 72. The water and soiled media 68 thus are disposed of through the motorized auger 90. The present invention anticipates the motor 62 being reversible to facilitate the cleaning process.

A screw gear 106 is operationally engaged to the motor 62, the scraping arm 20, and the shaft 54. The scraping arm 20 is slidably attached to the shaft 54 and thus is selectively positionable relative to the media bed 30 by action of the screw gear 106. The present invention anticipates other means for selectively adjusting a rotational speed of the scraping arm 20 and a rate at which the scraping arm 20 is lowered into the media bed 30, such as gearboxes, linear actuators, and the like. Such adjustments may be made to optimize filtration based on a composition and other characteristics of the mixture 34.

One configuration of the scraping arm 20 is detailed in FIGS. 4 and 5, wherein the scraping arm 20 comprises a first pipe 108, which extends angularly from the shaft 54. A second pipe 110 extends arcuately and bidirectionally from the first pipe 108 distal from the shaft 54. The second pipe 110 is substantially parallel to the screen 18. The second pipe 110 is arcuate so that the second pipe 110 is concave when viewed from aft of the scraping arm 20. The plurality of slurry nozzles 22 is attached to the second pipe 110.

A plate 112 is attached by its upper edge 114 to and extends along the second pipe 110. The plate 112 has a concave side 116 and a convex side 118, which face forward and aft, respectively. A blade 120 is attached to and extends from a lower edge 122 of the plate 112 so that the blade 120 is substantially parallel with the screen 18. The blade 120 is configured to remove the dewatered solids 66 and the soiled media 68 and, with the plate 112, to motivate the dewatered solids 66 and the soiled media 68 into the trough 72. The present invention also anticipates a stiffening arm 124, which is attached to and which extends between the first pipe 108 and the second pipe 110, as is shown in FIG. 3.

A guide assembly 126 may be attached to the scraping arm 20, as is shown in FIG. 5. The guide assembly 126 comprises a pair of uprights 128, the uprights 128 of which are attached singly to opposed ends 130 of the blade 120 and which extend upwardly. Each beam 132 of a pair of beams 132 is attached to and extends bidirectionally and angularly from a respective upright 128 so that an aft end 134 of the beam 132 is closer to the screen 18 than a forward end 136 of the beam 132. A forward roller 138 is attached to and extends between the forward ends 136 of the beams 132. An aft roller 140, which is circumferentially smaller than the forward roller 138, is attached to and extends between the aft ends 134 of the beams 132. The guide assembly 126 is configured to control a depth of the blade 120 into the media bed 30 based on positioning of the forward roller 138 and the blade 120 relative to the screen 18.

Other configurations of the solid-liquid filtration assembly 10 are anticipated. For example, the scraping arm 20 could be fixedly attached to the shaft 54 and the pan 16 could be slidably engaged to the shaft 54 and the frame 14. Thus, slowly raising the pan 16 would cause the media bed 30 to contact the scraping arm 20. In another example, the scraping arm 20 may be fixed relative to the frame 14 (nonrotatable) and the screen 18 rotatable.

The present invention anticipates a solid-liquid filtration system 142, which comprises a solid-liquid filtration assembly 10, according to the specification above. A wide variety of configurations for the solid-liquid filtration system 142 are anticipated by the present invention, with the required components and designs being well known to those skilled in the art of filtration systems. What follows is but one example.

The solid-liquid filtration system 142 comprises separation media 28, which is positioned on the screen 18 and forms a media bed 30 capable of separating solids 32 from a mixture 34 of a liquid 36 and the solids 32. The solid-liquid filtration system 142 also comprises a mixture tank 58, which contains the mixture 34 and which is in fluidic communication with the inlet port 56. The plurality of slurry nozzles 22 is positioned to deliver the mixture 34 to the media bed 30 aft of the scraping arm 20. The scraping arm 20 is positioned to remove dewatered solids 66 and soiled media 68 from atop the media bed 30, forward of the scraping arm 20, and to expel the dewatered solids 66 and the soiled media 68 from the pan 16.

The solid-liquid filtration system 142 also comprises a filtrate tank 50, which is in fluidic communication with the vacuum connector 48 and a vacuum pump 52. As such, the filtrate tank 50 is under a partial vacuum and a partial pressure exists below the screen 18 to facilitate filtration of the mixture 34. The drain tube 40 is positioned to drain the filtrate 42 from the pan 16 to the filtrate tank 50.

Figure 8:
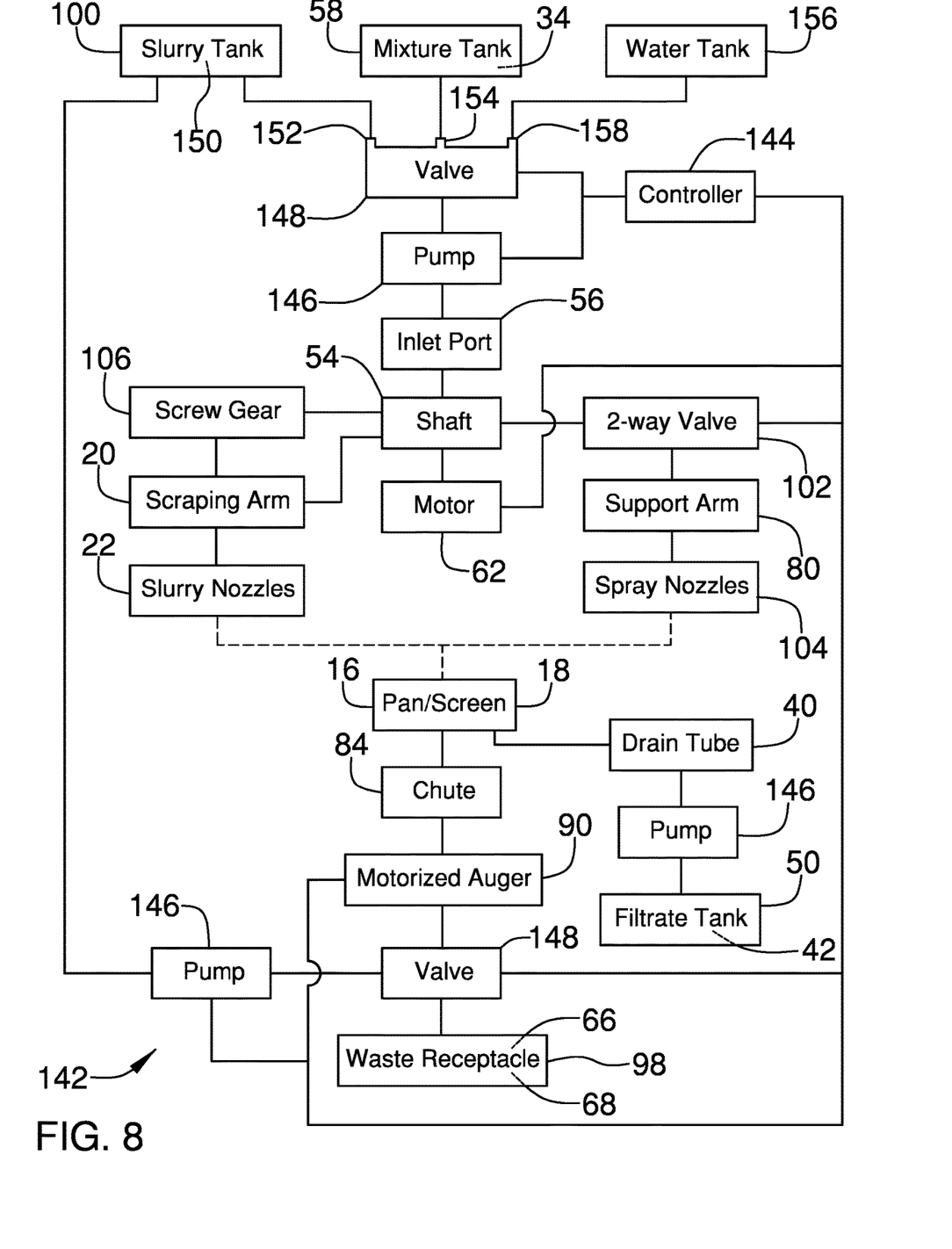
FIG. 8 is a block diagram of an embodiment of the disclosure.

The present invention anticipates the solid-liquid filtration system 142 being fully automated, thereby reducing labor requirements and operational expenses while increasing safety relative to prior art filtration systems. The solid-liquid filtration system 142 may include a controller 144, pumps 146, and valves 148. A valves 148 attached to the inlet port 56 could allow for selective addition of a media slurry 150 from a slurry tank 100 to precoat the screen 18 with separation media 28 via a first port 152, for selective addition the mixture 34 to be separated from a mixture tank 58, via a second port 154, and water from a water tank 156 for cleaning the screen 18 via a third port 158.

Slurry tank 100, in the context of this disclosure, should be interpreted to mean any vessel in which separation media 28 and water are mixed to form a media slurry 150 prior to its application to a screen 18 to form the media bed 30 in the precoating process. Water generated in the precoating process passes through the screen 18 and can be returned to the slurry tank 100 by means of a pump 146. An important distinction between the solid-liquid filtration assembly 10 and prior art filtration assemblies is that the precoating process can be performed at atmospheric pressure, whereas prior art filtration assemblies require one or both of increased pressure above the media slurry 150 and a partial pressure below the screen 18.

Figure 9:
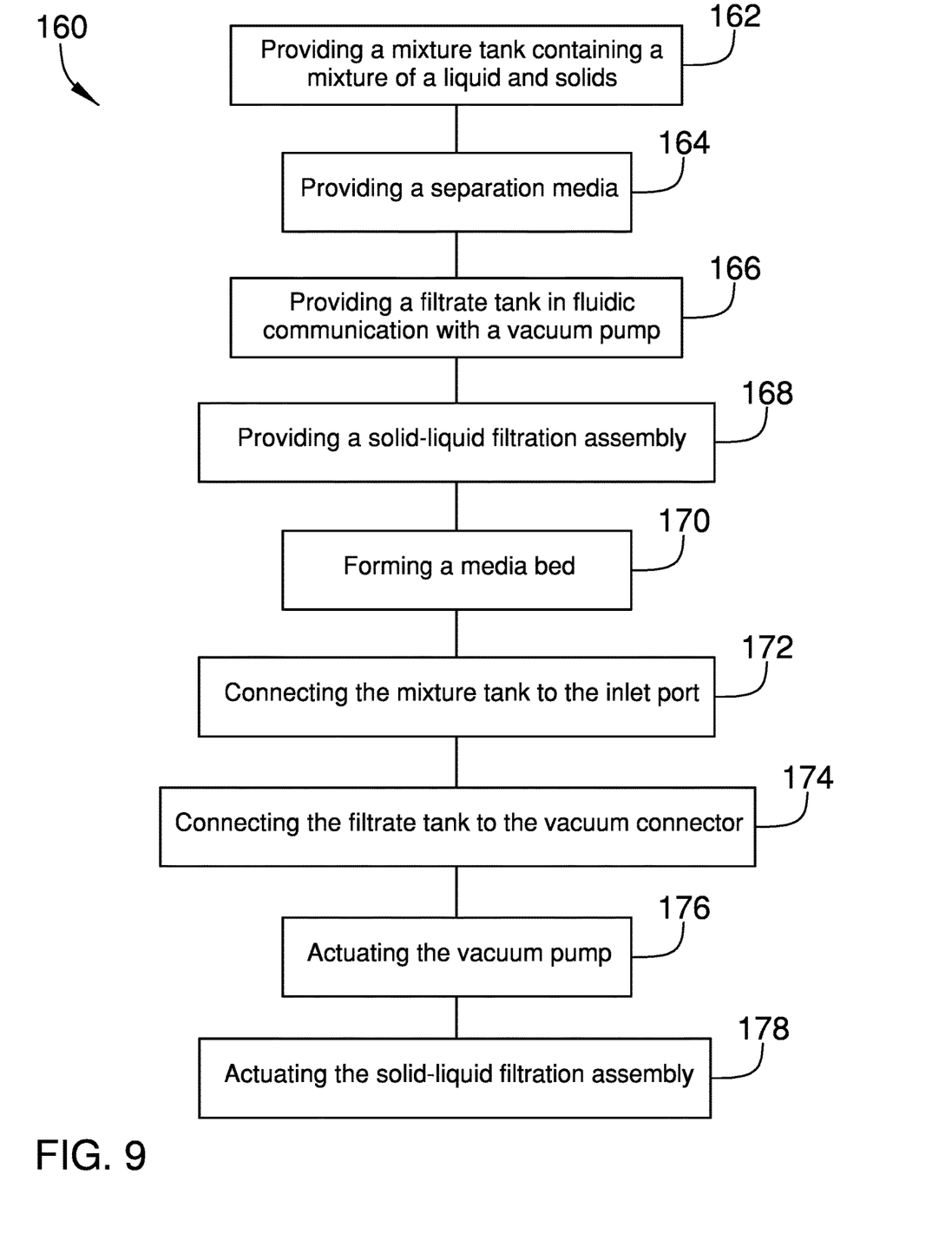
FIG. 9 is a flow diagram for a method utilizing an embodiment of the disclosure.

In use, the solid-liquid filtration assembly 10 enables a method of filtering solids from a solid-liquid mixture 160. The method 160 comprises a first provision step 162, which entails providing a mixture tank 58 containing a mixture 34 of a liquid 36 and solids 32 to be filtered. A second provision step 164 of the method 160 is providing a separation media 28. A third provision step 166 of the method 160 is providing a filtrate tank 50 in fluidic communication with a vacuum pump 52. A fourth provision step 168 of the method 160 is providing a solid-liquid filtration assembly 10, according to the specification above.

A first setup step 170 of the method 160 is forming a media bed 30, using the separation media 28, capable of separating the solids 32 from the mixture 34. A second setup step 172 of the method 160 is connecting the mixture tank 58 to the inlet port 56. A third setup step 174 of the method 160 is connecting the filtrate tank 50 to the vacuum connector 48. A first operational step 176 of the method 160 is actuating the vacuum pump 52 so that a partial pressure exists below the screen 18 to facilitate filtration of the mixture 34. A second operational step 178 of the method 160 is actuating the solid-liquid filtration assembly 10. In so doing, the plurality of slurry nozzles 22 delivers the mixture 34 to the media bed 30 aft of the scraping arm 20. The scraping arm 20 rotates and removes dewatered solids 66 and soiled media 68 from atop the media bed 30, forward of the scraping arm 20, and expels the dewatered solids 66 and the soiled media 68 from the pan 16. The drain tube 40 drains the filtrate 42 from the pan 16 to the filtrate tank 50.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A solid-liquid filtration assembly comprising:
   a frame;
   a filter module attached to and positioned within the frame, the filter module comprising:
      a pan, the pan being circular,
      a screen attached to the pan, wherein the screen is configured for positioning of a separation media for forming a media bed capable of separating solids from a mixture of a liquid and the solids,
      a drain tube attached to the pan below the screen, wherein the drain tube is configured for draining of filtrate from the pan,
      a scraping arm, the scraping arm being tubular, and
      a plurality of slurry nozzles attached to the scraping arm;
   a shaft rotatably attached to the frame and extending axially through the pan and the screen, the scraping arm being attached to the shaft, such that the scraping arm rotates concurrently with the shaft;
   an inlet port in fluidic communication with the scraping arm and being configured for attachment to a source of the mixture;
   a motor attached to the frame and operationally engaged to the shaft, such that the motor is enabled for selectively rotating the shaft and the scraping arm, wherein the scraping arm is configured for removing dewatered solids and soiled media from atop the media bed, forward of the scraping arm, and expelling the dewatered solids and the soiled media from the pan, and wherein the plurality of slurry nozzles is configured for delivering the mixture to the media bed aft of the scraping arm.

2. The solid-liquid filtration assembly of claim 1, wherein the filter module is one of a plurality of filter modules.

3. The solid-liquid filtration assembly of claim 1, wherein a bottom of the pan has a cross-sectional profile, the cross-sectional profile being V-shaped.

4. The solid-liquid filtration assembly of claim 1, wherein the screen is corrugated.

5. The solid-liquid filtration assembly of claim 1, further including:
   a first terminus of the drain tube being attached to the pan;
   a second terminus of the drain tube being positioned proximate to the frame; and
   a vacuum connector is attached to the second terminus, wherein the vacuum connector is configured for connecting to a filtrate tank under partial vacuum, such that a partial pressure exists below the screen for facilitating filtration of the mixture.

6. The solid-liquid filtration assembly of claim 5, wherein the drain tube has two first termini, such that the drain tube is Y-shaped, the first termini being opposingly positioned relative to the shaft.

7. The solid-liquid filtration assembly of claim 1, wherein:
   the shaft is tubular, such that the scraping arm is in fluidic communication with the shaft; and
   the inlet port is rotationally attached to an upper end of the shaft, such that the inlet port is stationary relative to the frame.

8. The solid-liquid filtration assembly of claim 1, further including:
   the filter module comprising:
      a ring attached within and extending circumferentially around the pan proximate to a top of the pan, the ring being L-shaped, such that the pan and the ring define a trough, the screen being attached to a lower limit of the ring,
      a support arm attached to and extending from the shaft substantially opposite the scraping arm,
      a scraper attached to and extending from the support arm into the trough;
      a cutout positioned in a lower facet of ring, and
      a chute attached to the ring and extending from the cutout, wherein the chute is configured for directing the dewatered solids and the soiled media away from the filter module;
   the scraping arm being slidably attached to the shaft; and a screw gear operationally engaged to the motor, the scraping arm, and the shaft, such that the scraping arm is selectively positionable relative to the media bed.

9. The solid-liquid filtration assembly of claim 8, further including a motorized auger attached to the frame and positioned for receiving the dewatered solids and the soiled media from the chute, wherein the motorized auger is configured to discharge the dewatered solids and the soiled media.

10. The solid-liquid filtration assembly of claim 8, further including:
   the shaft being tubular;
   the support arm being tubular such that the support arm is in fluidic communication with the shaft;
   a two-way valve positioned between the support arm and the shaft; wherein the two-way valve is configured for selectively allowing entry of water pumped through the inlet port into the support arm; and
   a plurality of spray nozzles attached to the support arm, wherein the spray nozzles are configured for spraying the water onto the screen for motivating soiled media on the screen to the trough.

11. The solid-liquid filtration assembly of claim 8, wherein the scraping arm comprises:
   a first pipe extending angularly from the shaft;
   a second pipe extending arcuately and bidirectionally from the first pipe distal from the shaft, the second pipe being arcuate, such that the second pipe is concave when viewed from aft of the scraping arm, the plurality of slurry nozzles being attached to the second pipe;
   a plate having an upper edge attached to and extending along the second pipe, the plate having a concave side and a convex side facing forward and aft, respectively; and
   a blade attached to and extending from a lower edge of the plate, such that the blade is substantially parallel with the screen, wherein the blade is configured for removing the dewatered solids and the soiled media and for motivating the dewatered solids and the soiled media into the trough.

12. The solid-liquid filtration assembly of claim 11, further including a guide assembly attached to the scraping arm, the guide assembly comprising:
   a pair of uprights attached singly to opposed ends of the blade and extending upwardly;
   a pair of beams, each beam being attached to and extending bidirectionally and angularly from a respective upright, such that an aft end of the beam is closer to the screen than a forward end of the beam;
   a forward roller attached to and extending between forward ends of the beams; and
   an aft roller attached to and extending between the aft ends of the beams, the aft roller being circumferentially smaller than the forward roller, wherein the guide assembly if configured for controlling a depth of the blade into the media bed.

13. A solid-liquid filtration system comprising:
   a solid-liquid filtration assembly comprising:
      a frame;
      a filter module attached to and positioned within the frame, the filter module comprising:
         a pan, the pan being circular,
         a screen attached to the pan,
         a drain tube attached to the pan below the screen, a first terminus of the drain tube being attached to the pan, a second terminus of the drain tube being positioned proximate to the frame,
         a vacuum connector is attached to the second terminus,
         a scraping arm, the scraping arm being tubular, and a plurality of slurry nozzles attached to the scraping arm,
         a shaft rotatably attached to the frame and extending axially through the pan and the screen, the scraping arm being attached to the shaft, such that the scraping arm rotates concurrently with the shaft,
         an inlet port in fluidic communication with the scraping arm, and
         a motor attached to the frame and operationally engaged to the shaft, such that the motor is enabled for selectively rotating the shaft and the scraping arm;
      a separation media positioned on the screen forming a media bed capable of separating solids from a mixture of a liquid and the solids;
   a mixture tank containing the mixture in fluidic communication with the inlet port, such that the plurality of slurry nozzles is positioned for delivering the mixture to the media bed aft of the scraping arm, and such that the scraping arm is positioned for removing dewatered solids and soiled media from atop the media bed, forward of the scraping arm, and for expelling the dewatered solids and the soiled media from the pan;
   a filtrate tank in fluidic communication with the vacuum connector; and
   a vacuum pump in fluidic communication with the filtrate tank, such that the filtrate tank is under a partial vacuum, such that a partial pressure exists below the screen for facilitating filtration of the mixture, and such the drain tube is positioned for draining of filtrate from the pan to the filtrate tank.

14. A method of filtering solids from a solid-liquid mixture comprising the steps of:
   providing a mixture tank containing a mixture of a liquid and solids to be filtered;
   providing a separation media;
   providing a filtrate tank in fluidic communication with a vacuum pump;
   providing a solid-liquid filtration assembly comprising:
      a frame;
      a filter module attached to and positioned within the frame, the filter module comprising:
         a pan, the pan being circular,
         a screen attached to the pan,
         a drain tube attached to the pan below the screen, a first terminus of the drain tube being attached to the pan, a second terminus of the drain tube being positioned proximate to the frame,
         a vacuum connector is attached to the second terminus,
         a scraping arm, the scraping arm being tubular, and a plurality of slurry nozzles attached to the scraping arm,
         a shaft rotatably attached to the frame and extending axially through the pan and the screen, the scraping arm being attached to the shaft, such that the scraping arm rotates concurrently with the shaft,
         an inlet port in fluidic communication with the scraping arm, and
         a motor attached to the frame and operationally engaged to the shaft, such that the motor is enabled for selectively rotating the shaft and the scraping arm;

forming a media bed, using the separation media, capable of separating the solids from the mixture;
connecting the mixture tank to the inlet port;
connecting the filtrate tank to the vacuum connector;
actuating the vacuum pump, such that a partial pressure exists below the screen for facilitating filtration of the mixture; and
actuating the solid-liquid filtration assembly, such that the plurality of slurry nozzles delivers the mixture to the media bed aft of the scraping arm, such that the scraping arm rotates and removes dewatered solids and soiled media from atop the media bed, forward of the scraping arm, and expels the dewatered solids and the soiled media from the pan, and such that the drain tube drains filtrate from the pan to the filtrate tank.

* * * * *